US010526202B2

(12) United States Patent
Mukthiyar et al.

(10) Patent No.: US 10,526,202 B2
(45) Date of Patent: Jan. 7, 2020

(54) PROCESS FOR PRODUCTION OF HIGH QUALITY SYNGAS THROUGH REGENERATION OF COKED UPGRADATION AGENT

(71) Applicant: Indian Oil Corporation Limited, Bandra (East), Mumbai (IN)

(72) Inventors: Sadhullah Mukthiyar, Faridabad (IN); Sayapaneni Gopinath Bhanuprasad, Faridabad (IN); Gadari Saidulu, Faridabad (IN); Eswar Prasad Dalai, Faridabad (IN); Sanjeev Singh, Faridabad (IN); Satheesh Vetterkunnel Kumaran, Faridabad (IN); Debasis Bhattacharyya, Faridabad (IN); Brijesh Kumar, Faridabad (IN); Biswapriya Das, Faridabad (IN)

(73) Assignee: Indian Oil Corporation Limited, Bandra (East), Mumbai (IN)

( * ) Notice: Subject to any disclaimer, the term of this patent is extended or adjusted under 35 U.S.C. 154(b) by 37 days.

(21) Appl. No.: 15/240,425

(22) Filed: Aug. 18, 2016

(65) Prior Publication Data

US 2017/0129776 A1 May 11, 2017

(30) Foreign Application Priority Data

Nov. 9, 2015 (IN) .......................... 4266/MUM/2015

(51) Int. Cl.
*C01B 3/12* (2006.01)
*B01J 7/02* (2006.01)
(Continued)

(52) U.S. Cl.
CPC .................. *C01B 3/12* (2013.01); *B01J 7/02* (2013.01); *B01J 8/0015* (2013.01); *B01J 8/085* (2013.01);
(Continued)

(58) Field of Classification Search
CPC .... C10G 11/14; C10G 11/00; C10G 2300/70; C01B 3/12; C01B 3/02; C01B 3/56;
(Continued)

(56) References Cited

U.S. PATENT DOCUMENTS 4,224,140 A * 9/1980 Fujimori ................ B01J 23/745
208/109
4,412,914 A 11/1983 Hettinger et al.
(Continued)

*Primary Examiner* — Amber R Orlando
*Assistant Examiner* — Syed T Iqbal
(74) *Attorney, Agent, or Firm* — Workman Nydegger

(57) ABSTRACT

The present invention relates to a process for the production of high quality synthesis gas rich in hydrogen during the process of upgrading the residual hydrocarbon oil feedstock by rejuvenating the spent upgrading material in Reformer in absence of air/oxygen without supplying external heat source other than the heat generated inside the process during combustion of residual coke deposited on the upgrading material. The present invention further relates to the apparatus used for preparation of syngas wherein said syngas thus produced is used for production of hydrogen gas. Furthermore, the present invention also provides system and method for preparing pure hydrogen from syngas.

7 Claims, 2 Drawing Sheets

(51) Int. Cl.
*B01J 8/00* (2006.01)
*B01J 8/08* (2006.01)
*C01B 3/02* (2006.01)
*C01B 3/56* (2006.01)
*C10G 11/00* (2006.01)
*B01J 19/24* (2006.01)

(52) U.S. Cl.
CPC ............ *B01J 8/087* (2013.01); *B01J 19/245* (2013.01); *C01B 3/02* (2013.01); *C01B 3/56* (2013.01); *C10G 11/00* (2013.01); *B01J 2208/00769* (2013.01); *B01J 2219/24* (2013.01); *C01B 2203/0283* (2013.01); *C01B 2203/042* (2013.01); *C01B 2203/045* (2013.01); *C01B 2203/0485* (2013.01); *C01B 2203/0883* (2013.01); *C10G 2300/70* (2013.01)

(58) Field of Classification Search
CPC ...... C01B 2203/0283; C01B 2203/042; C01B 2203/045; C01B 2203/0485; C01B 2203/0883; B01J 19/245; B01J 2208/00769; B01J 2219/24; B01J 7/02; B01J 8/0015; B01J 8/085; B01J 8/087
See application file for complete search history.

(56) References Cited

U.S. PATENT DOCUMENTS

| | | | |
|---|---|---|---|
| 4,425,259 | A | 1/1984 | Hettinger et al. |
| 4,450,241 | A | 5/1984 | Hettinger et al. |
| 4,915,820 | A | 4/1990 | Hettinger |
| 6,169,054 | B1 * | 1/2001 | Pereira .................. C10B 57/06 208/131 |
| 6,491,810 | B1 | 12/2002 | Mayes |
| 6,585,884 | B1 | 7/2003 | Mayes |
| 6,913,687 | B2 | 7/2005 | Mayes |
| 7,699,975 | B2 | 4/2010 | Hedrick |
| 7,744,753 | B2 | 6/2010 | Towler |
| 7,787,075 | B2 | 8/2010 | Hedrick |
| 7,915,191 | B2 | 3/2011 | Hedrick |
| 7,932,204 | B2 | 4/2011 | Towler |
| 7,935,245 | B2 | 5/2011 | Towler |
| 8,518,334 | B2 | 8/2013 | Towler |

* cited by examiner

PROCESS FOR PRODUCTION OF HIGH QUALITY SYNGAS THROUGH REGENERATION OF COKED UPGRADATION AGENT

FIELD OF THE INVENTION

The present invention relates to a process for production of high quality syngas rich in hydrogen by upgrading a residual hydrocarbon oil feedstock and an upgrading material. The present invention also provides an apparatus for preparing high quality syngas rich in hydrogen. Further the present invention also provides system and method for preparing pure hydrogen from syngas.

BACKGROUND

Synthesis gas, which is also known as syngas, is a mixture of gases comprising primarily carbon monoxide (CO) and hydrogen ($H_2$). Very often it contains carbon dioxide and also Nitrogen. Generally, syngas may be produced from any carbonaceous material. In particular, biomass such as agricultural wastes, forest products, grasses, and other cellulosic material may also be converted to syngas. The composition of syngas highly dependent upon the type of process, feedstock and oxidant used for production. The heating value of syngas is dependent upon the specific chemical composition of the syngas. Gasification-derived syngas differs from the syngas produced from steam methane reforming in terms of composition, calorific value and other contaminants. Syngas produced from air-blown gasifiers typically contains about 50% $N_2$ and 5-20% $CO_2$ and heating value as low as 120 Btu/ft$^3$, which ultimately limits the usage of this gas.

Syngas is a platform intermediate in the chemical and bio-refining industries and has a vast number of uses. Syngas may be used as a feedstock for producing a wide range of chemical products, including liquid fuels, alcohols, acetic acid, dimethyl ether and many other chemical products. These chemicals can be blended into, or used directly as, diesel fuel, gasoline, and other liquid fuels. Syngas can also be directly combusted to produce heat and power. The substitution of alcohols in place of petroleum-based fuels and fuel additives can be particularly environmentally friendly when the alcohols are produced from feed materials other than fossil fuels. However, this syngas needs to be directly produced and converted at the resource site to fuels and/or chemical products since it is not practical to transport the syngas to distant refineries and chemical processing plants.

Improved methods are needed to more cost-effectively produce syngas. Since the syngas generation is a potentially costly step, several alternative processes for syngas generation have been developed.

One alternative process for syngas generation involves the catalytic or thermal reforming reaction between carbon dioxide and methane (typically referred to as dry reforming). An attractive feature of this method is that carbon dioxide is converted into syngas; however, this method has problems with rapid carbon deposition. The carbon deposition or coke forming reaction is a separate reaction from the one that generates the syngas and occurs subsequent to the syngas formation reaction. However, the reaction of methane in dry reforming is slow enough that long residence times are required for high conversion rates and these long residence times lead to coke formation. The ratio of hydrogen to carbon monoxide, which is formed from this process, is typically approximately 1.0.

A second alternative process for synthesis gas generation involves partial oxidation of methane using oxygen, where the oxygen can be either air, enriched air, or oxygen with a purity in excess of 90%, preferably in excess of 99%. The ratio of hydrogen to carbon monoxide, which is formed from this process, is typically approximately 2.0. However, in commercial practice, some amount of steam is typically added to a partial oxidation reformer in order to control carbon formation and the addition of steam tends to increase the $H_2$/CO ratio above 2.0. Likewise it is common to add relatively small amounts of $CO_2$ to the feed gas mixture in an attempt to adjust the ratio closer to 2.0.

A third approach is to produce syngas with a $H_2$/CO ratio between 0.5 and 1 using a mixture of LPG and $CO_2$ (Calcor process). See, Hydrocarbon Processing, Vol. 64, May 1985, pp. 106-107 and "A new process to make Oxo-feed," Hydrocarbon Processing, Vol. 66, July 1987, pg. 52. However, many natural gas resource sites, in particular the stranded natural gas sites, do not have the infrastructure available to separate LPG and $CO_2$ from the natural gas.

Following the production of the syngas, many processes and catalysts have been proposed for the production of transportation fuels and chemicals. However, the traditional process for production of fuels and chemicals from syngas involves the production first of a paraffinic wax product that is then refined into fuels and/or chemicals. The refining step is capital intensive and complex to operate, therefore requiring large plant sizes to justify this refining system.

The resources of heavy or low API (American Petroleum Institute) gravity crude oil in the world are more than twice those of conventional light crude oil. Processing of these heavy crude oils provide higher refinery margins. Up-gradation of high residuum content with higher coke forming characteristics through conventional coking processes results in production of significant quantity of low value petroleum coke as by product. Delayed Coking & fluid coking processes produces high amount of low value petroleum coke, which is typically 1.5 times of Concarbon, which means, processing of heavy crude oil having 40% VR with 27% concarbon will produce 16 MT of coke as by product per every 100 MT of crude oil. The price of coke is very low as compared to crude oil price, approximately ⅒th of crude oil price and it erodes the refinery margin heavily. In the current scenario, sustaining the refinery margin in view of ever deteriorating quality of crude oil mainly depends on the profit margin gained from the upgradation of the residue to yield more liquid and less of low value byproducts such as coke.

It is possible to produce higher grade oils through catalytic cracking processes. The feedstock is limited to light residue oils that boil below 550° C. due to excessive regenerator temperatures. In such cases, catalyst coolers are typically used for recovering the extra heat in order to limit the regenerator temperatures. Fresh catalyst make up rate also goes up due to increased catalyst deactivation. Even with the use of catalyst coolers (internal or external cooling) & increased fresh catalyst make up rate, 10 to 30% heavy residue content that boils above 550° C. can be processed along with the light residue oil due to unmanageable coke yield and heat of combustion with the 100% heavy residue content. Further, such catalyst coolers are costly and unreliable.

Various techniques have been proposed in the prior art for handling the extra coke and heat of combustion generated during the cracking of heavy residue content in a circulating fluidized bed. U.S. Pat. Nos. 4,412,914, 4,425,259, 4,450,241, 4,915,820, 6,491,810, 6,585,884, 6,913,687, 7,699,975, 7,744,753, 7,767,075, 7,915,191, 7,932,204, 7,935,245 and 8,518,334 explains the various techniques of gasification of coke deposited during residue feedstock cracking using oxygen containing gases, $CO_2$ and or steam. As these processes use $CO_2$ and or oxygen containing gases as gasifying agent, the syngas produced contains large amount of $CO_2$ and calorific value of the same is very low.

Therefore, there is need of a process which can convert the low value resid streams containing significant amount of concarbon to low boiling point products lean in impurities and high quality synthesis gas rich in hydrogen.

SUMMARY OF THE INVENTION

The present invention relates to a process for producing syngas rich in hydrogen, during the process of upgrading residual hydrocarbon oil feedstock, the process comprising, partially regenerating spent upgrading agent, obtained from a Riser, in a Reformer with steam and in absence of oxygen containing gases to obtain syngas rich in hydrogen, wherein the spent upgrading agent constitutes 1 to 5 wt % coke, and the Reformer is maintained at a temperature of 650 to 850° C. without supplying external heat.

The present invention further relates to the high quality syngas comprising of 50-70 vol % hydrogen, 12-18% vol % carbon monoxide, 10-15 vol % Carbon dioxide, 1-4 vol % methane and sour gases like $H_2S$ and COS (on dry basis).

The present invention further relates to a process for producing syngas rich in hydrogen, during the process of upgrading residual hydrocarbon oil feedstock, the process comprising:
 a) cracking a residual hydrocarbon oil feedstock in a Riser-Reactor by contacting the feedstock with a rejuvenated upgrading agent at a temperature in the range of 550° C. to 650° C. to obtain cracked products and spent upgrading agent;
 b) separating the spent upgrading agent from the cracked products in a Stripper and transferring the spent upgrading agent to a Reformer;
 c) regenerating the coke deposited on the spent upgrading agent by adding steam free of any air/oxygen along with organo-metallic additive selected from alkali, alkaline earth metal or transition metal additive in the Reformer at a temperature in the range of 600 to 850° C. to obtain syngas rich in hydrogen and partially rejuvenated upgrading agent and transferring the partially rejuvenated upgrading agent to a Combustor;
 d) burning off the partially rejuvenated upgrading material in the Combustor at temperature in the range of 750° C. to 950° C. to remove residual coke in presence of stream of oxygen containing gases and optionally a hydrocarbon stream lean in sulfur and nitrogen impurities, to obtain rejuvenated upgrading agent and flue gas;
 e) transferring the rejuvenated upgrading agent back to the Reformer to maintain the temperature of the Reformer; and
 f) circulating the rejuvenated upgrading agent from the Reformer to the Riser.

The present invention furthermore relates to a system for producing syngas rich in hydrogen, during the process of upgrading residual hydrocarbon oil feedstock, the system comprising:
 a) cracking zone comprising a Riser-Reactor [1];
 b) a two stage regeneration zone comprising a Reformer [3] and a Combustor [4]; and
 c) a circulation zone comprising a means [16] for recycling of rejuvenated upgrading material from Combustor [4] to Reformer [3].

DESCRIPTION OF THE INVENTION

Figure 1:
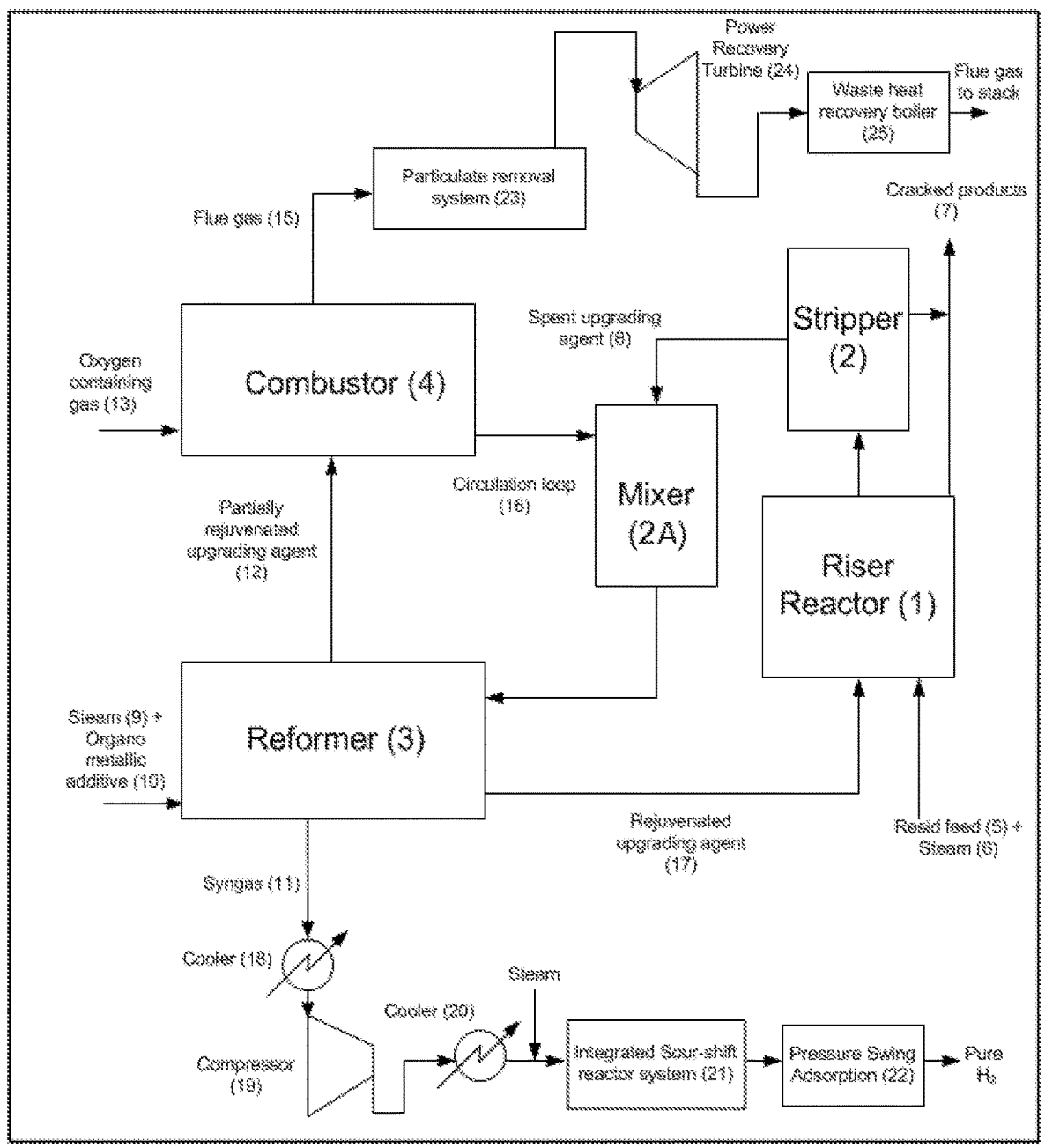
FIG. 1: Schematic diagram of process comprising of upgrading residual oil containing high concentration of concarbon into higher grade oil and high quality synthesis gas.

While the invention is susceptible to various modifications and/or alternative processes and/or compositions, specific embodiment thereof has been shown by way of example in the drawings and will be described in detail below. It should be understood, however that it is not intended to limit the invention to the particular processes and/or compositions disclosed, but on the contrary, the invention is to cover all modifications, equivalents, and alternative falling within the spirit and the scope of the invention as defined by the appended claims.

The drawings shows those specific details that are pertinent to understanding the embodiments of the present invention so as not to obscure the disclosure with details that will be readily apparent to those of ordinary skill in the art having benefit of the description herein.

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

The present invention provides a process for the production of high quality synthesis gas or syngas rich in hydrogen by partial regeneration of coke with steam in the absence of air/oxygen without supplying external heat source other than the heat generated inside the process during combustion of residual coke deposited on the upgrading material. In another aspect this also provides an apparatus for the production of high quality synthesis gas rich in hydrogen. Further aspect of the present invention provides a system and method for production of pure hydrogen.

Thus an aspect of the present invention provides a method comprising of upgrading residual hydrocarbon oil feedstock or resid feed [5] (residual hydrocarbon oil feedstock and resid feed can interchangeably be used in context of the present invention) containing high concentration of impurities such as concarbon into higher grade oils and high quality synthesis gas containing high amount of hydrogen includes a cracking zone comprising of Riser Reactor [1], a two stage regeneration zone comprising of Reformer [3] and Combustor [4] and a circulation zone comprising of a means [16] for circulation of rejuvenated upgrading material from Combustor to Reformer.

Another aspect of the present invention provides that the cracking zone comprises a means [5] for injecting residual hydrocarbon oil feedstock or resid feed, a means [6] for injecting fluidizing cum atomizing medium such as steam and a means [17] for introducing a the rejuvenated upgrading material into the Riser Reactor or cracking zone [1]. The rejuvenated upgrading material or rejuvenating upgrading agent coming from the regeneration zone (Reformer [3]) will be lifted by fluidization medium in the Riser Reactor. Instantaneous feedstock vaporization takes place in the Riser Reactor [1] as soon as the residue hydrocarbon stream contacts with the rejuvenated upgrading material [17].

Prior to injection of residual hydrocarbon feedstock oil or resid feed, hydrocarbon stream of the feed stock or resid feed is pre-mixed with superheated steam and then dispersed with use of a nozzle by applying a high shear force so that it makes tiny droplets while injecting the same into cracking reactor/Riser Reactor [1]. Steam dispersion in hydrocarbon reduces partial pressure, average molecular weight and boiling point of the hydrocarbon mixture so that the maximum amount of feedstock is vaporized quickly at feed mix zone temperature. Apart from feed atomization, some amount of steam can also be injected at the downstream of feed injection point to reduce the partial pressure in the cracking reactor. Total Steam to Oil ratio in the present invention will be in the range of 0.3 to 1.5 wt/wt.

The residue feed may also be charged to the cracking reactor in combination with other diluents such as naphtha, refinery fuel gas or other suitable vapors or gases such as cracked gases of the present invention to aid with vaporization-atomization of the high boiling oil feed.

Upgrading material of the present invention consists of the microspheres wherein these microspheres are prepared using the conventional art of FCC catalyst preparation i.e. by preparing the solution of desired chemical composition followed by spray drying and calcination.

Typically, these materials have very less acidic cracking activity as characterized by MAT activity of less than 10. However, our invention is not limited to low activity upgrading material alone. Total deposited metals on the circulating upgrading material would be as high as 1-2 wt % and metal level on the circulating upgrading material is controlled by adjusting the fresh upgrading material addition rate to the system.

As the residue feedstock contacts the regenerated upgrading material/rejuvenated upgrading agent in the Riser Reactor, feedstock gets vaporized and cracking of hydrocarbons takes place along the length of the Riser Reactor to yield lighter hydrocarbon products. Residue molecules are generally made of different layers of sheets bonded by heteroatoms such as metals, nitrogen, etc. metals, nitrogen, sulfur, are generally present as porphyrins, and/or concarbon.

These molecules are of very high molecular weight and generally do not vaporize below 550° C. During cracking, these compounds are deposited as coke on the surface of the upgrading material. Coke thus formed deposits in the pores of upgrading material and therefore blocks the surface area. As the concarbon values of feedstock increases, coke production increases. The coke lay down on the upgrading material may vary depending upon the circulation rate of the upgrading material, feed vaporization, which in turn depends on the outlet temperature of the cracking reactor.

Another aspect of the present invention provides that the cracked products [7] and spent upgrading material [8] (spent upgrading material and spent upgrading agent can be used interchangeably in context of the present invention) are separated in a reactor cum Stripper vessel [2], wherein the spent upgrading material is transferred to Reformer [3] after stripping off the hydrocarbons present in interstitial space and pores of the upgrading material. The spent upgrading material [8] constitutes 1 to 5 wt % coke and depends on the type of feed & operating conditions. The coke, which is evenly dispersed on the surface of the upgrading material in the form of a thin layer poses higher reactivity than the densified cold petroleum coke generated in the delayed coking process. Hereinafter, the coke deposited on the upgrading material is referred as nascent coke.

The nascent coke deposited on the upgrading material is partially regenerated by introducing steam [9] without any air/oxygen into the Reformer [3] for production of high quality syngas [11]. In another aspect the present invention provides a method for enhancing the rate of partial regeneration of coke with steam and hence the reactivity of the coke deposited on the upgrading material by deposition of a metal, which aids in promoting partial regeneration of coke with steam, on the surface of upgrading material by injection of an oil soluble organo metallic additive in the Reformer [3] through suitable injecting means [10]. The organo-metallic additive can also be injected in the dense bed of reactor stripper [2]. The partially rejuvenated upgrading material/agent [12] is then transferred to the Combustor [4] for burning off the residual coke with a stream of oxygen containing gases [13] to produce flue gas [15].

Another aspect of the present invention provides that flue gas is sent to a particulate removal system [23] for removal of catalyst fines before being sent to a power recovery turbine [24] for generation of power and waste heat recovery boiler [25] for generation of steam before being let out to atmosphere.

Another aspect of the present invention also provides a method for supplying the required heat for conducting endothermic reaction of partial regeneration of coke with steam in Reformer [3] by circulating the rejuvenated upgrading material from Combustor [4] to Reformer [3] by means of a circulating loop [16]. The rejuvenated upgrading material [17] is then transferred from Reformer [3] to the riser reactor [1] by means of a transfer line.

In another aspect of the present invention the rejuvenated upgrading material (rejuvenated upgrading material and rejuvenated upgrading agent can interchangeably be used in context of the present invention) recycled from the Combustor [4] is suitably mixed with the spent upgrading material received from the stripper prior to entering the Reformer [3] in the Mixer [2A]. The Mixer [2A] is either placed outside the Reformer [3] or forms the part of the Reformer [3] depending upon the design requirements. It is a known fact that in a typical FCC process, from the heat of reaction released due to complete combustion of coke, major amount of heat is transferred from Combustor to riser for supplying the endothermic heat of cracking and heating the hydrocarbon feed and steam to the reaction temperature. i.e, Reactor side heat requirements are satisfied by the heat released by burning of coke in the combustor. In this process the heat released by burning of coke in the combustor supplies the heat required for the reactor side and as well as the endothermic heat of reaction of the reformer. The temperatures of the Combustor [4] and the Reformer [3] are maintained by a recycle ratio i.e. the mass ratio of the rejuvenated upgrading material coming from the combustor to the spent upgrading material coming from the Stripper [2].

Although the invention increases the size of the Combustor [4] and Reformer [3] vessel but it saves a huge cost on the operation and the increase in the synthesis gas quality and quantity in a big way as compared to the operation using pure oxygen.

The Reformer [3] has a means [12] for transferring the partially rejuvenated upgrading material to the Combustor

[4]. The transfer of partially rejuvenated upgrading material to the Combustor [4] is done using a lift line. The solids circulation through the lift line is controlled through the opening of a plug valve located at the bottom of the Reformer.

Figure 2:
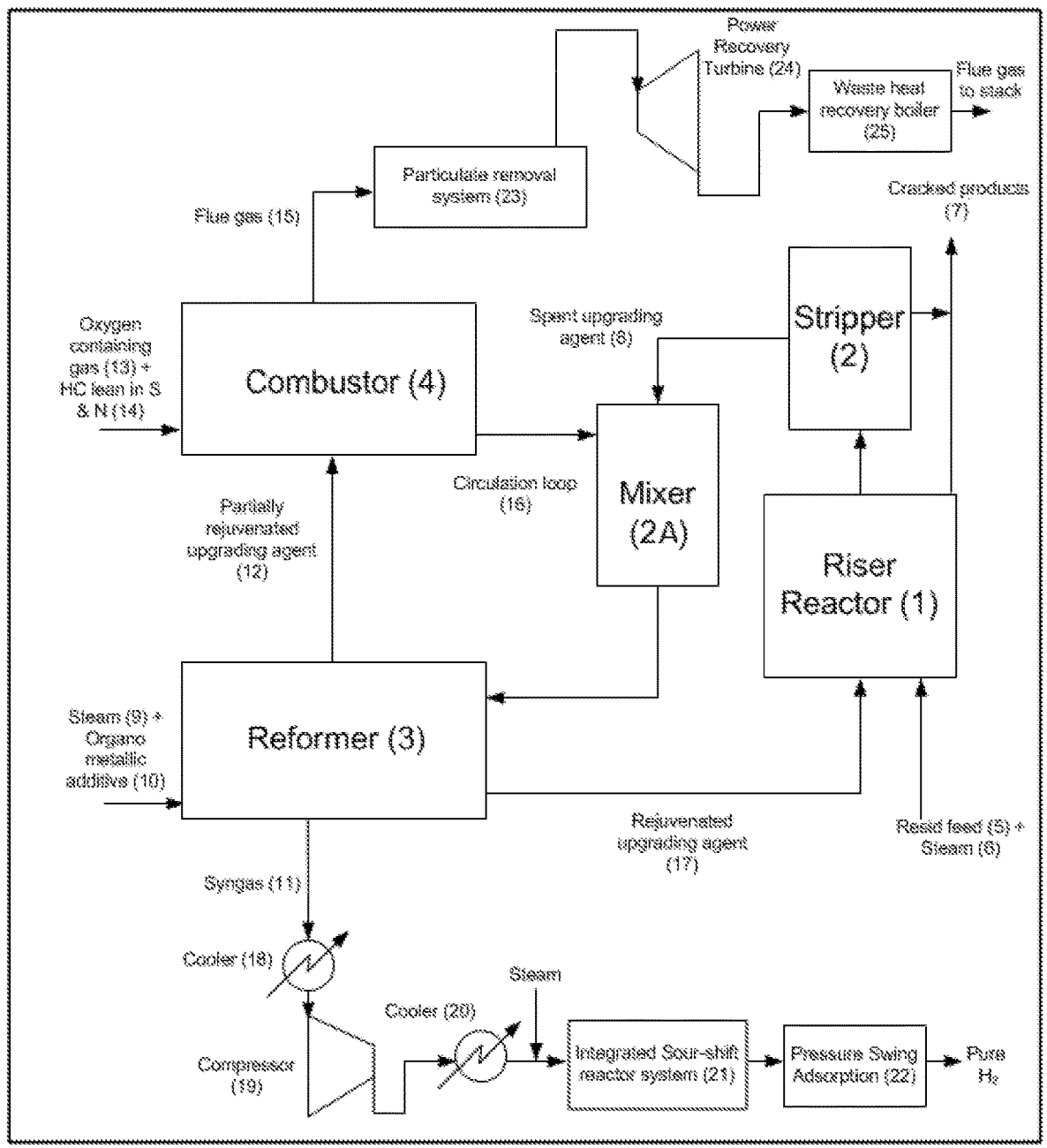
FIG. 2: Schematic diagram of process comprising passing of hydrocarbon stream lean in S and N in Combustor, in addition to the process of FIG. 1.

One more aspect of the present invention provides a process to produce high quality synthesis gas and at the same time to maintain the heat balance of the system., wherein the syngas quantity is further increased by reforming more coke with steam in the Reformer [3] and burning an external hydrocarbon stream lean in sulphur and nitrogen in Combustor [4] (FIG. 2) along with residual coke to maintain desired temperature of Combustor [4], through suitable means [14] so as to maintain the temperature of Combustor with burning lower amount of coke. Thus reduction of SOx and NOx emissions is achieved by burning hydrocarbon stream lean in sulfur and nitrogen impurities. The major amount of sulfur and nitrogen present in the coke is converted to Hydrogen sulfide and Ammonia, which is removed in the downstream section of Reformer [3].

Yet another aspect of the present invention provides a process to obtain high yield of syngas by reforming external hydrocarbon stream using steam as gasification agent in the Reformer [3] and burning the total coke in Combustor [4]. In one aspect of the present invention the upgrading material is circulated between Combustor [4] to Reformer [3] to Combustor [4] to maintain the desired temperature of Combustor and Reformer. In such an arrangement the spent upgrading material [8] from Stripper of riser reactor or riser zone [1] is directly transported to Combustor [4]. In this embodiment, SOx and NOx emissions is maximum as total coke is combusted in the Combustor.

A further aspect of the present invention provides that the total heat required by the Reformer [3] is supplied from the Combustor [4]. In other words the temperature conditions needed for the reaction to be carried in the Reformer [3] is being supplied and controlled by the heat originating from Combustor [4] as has discussed in the subsequent sections. The hot rejuvenated upgrading material from the Combustor [4] operating at a higher temperature in the range of 750-950° C. is recycled or circulated back to the Reformer [3] to maintain the temperature in the Reformer [3].

The following are the major reactions occur in the Reformer zone [3] and the Combustor zone [4].
Major reactions in Reformer [3]:

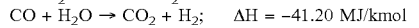

| | | |
|---|---|---|
| $C + H_2O \rightarrow CO + H_2$ | $\Delta H = +131.38$ MJ/kmol | (1) |
| $CO + H_2O \rightarrow CO_2 + H_2$ | $\Delta H = -41.20$ MJ/kmol | (2) |
| $C + 2H_2 \rightarrow CH_4$; | $\Delta H = -74.86$ MJ/kmol | (3) |
| $H_2 + S \rightarrow H_2S$; | $\Delta H = -20.5$ MJ/kmol | (4) |

Some minor reactions also occur in the Reformer 003 and is given below:

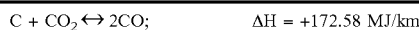
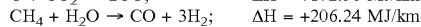

| | | |
|---|---|---|
| $C + CO_2 \leftrightarrow 2CO$; | $\Delta H = +172.58$ MJ/kmol | (5) |
| $CH_4 + H_2O \rightarrow CO + 3H_2$; | $\Delta H = +206.24$ MJ/kmol | (6) |

Major reaction in the Combustor zone 004:

| | | |
|---|---|---|
| $C + O_2 \rightarrow CO_2$ | $\Delta H = -393.5$ MJ/kmol | (7) |

Minor reaction in the Combustor 004:

| | | | |
|---|---|---|---|
| $C + \frac{1}{2}O_2 \rightarrow CO$ | $\Delta H = -111$ MJ/kmol | (8) | |
| $CO + \frac{1}{2}O_2 \rightarrow CO_2$ | $\Delta H = -283$ MJ/kmol | (9) | |
| $H_2 + \frac{1}{2}O_2 \rightarrow H_2O$; | $\Delta H = -242$ MJ/kmol | (10) | |
| $C + CO_2 \leftrightarrow 2CO$; | $\Delta H = +172.58$ MJ/kmol | (5) | |
| $S + O_2 \rightarrow SO_2$ | $\Delta H = -296.8$ MJ/kmol | (11) | Major |
| $2 SO_2 + O_2 \rightarrow 2 SO_3$ | $\Delta H = -198$ MJ/kmol | (12) | Negligible |
| $N + xO \rightarrow NO_x$ | $\Delta H = $ Dependent on x and on unit heat balance calculations) | (13) | |

There are many other reactions possible with the combination of the above gases but it is of little significance. As the Reformer operates purely with steam, reaction 1, 2 and 3 plays a major role, due to the presence of excess steam & high hydrogen atmosphere.

From the above scheme, reaction 1 is endothermic and 2, 3 and 4 are exothermic, and since reaction 1 drives the reactions 2 and 3, the overall reaction is endothermic, the endothermicity increases with little bit of participation of reactions 5 and 6. The reaction 1 is favorable at high temperatures (>650° C.), any source of additional oxygen to provide the excess heat required will deteriorate the syngas quality and increase in the greenhouse gas such as $CO_2$. In the present invention, the total heat required by the Reformer [3] is supplied from the Combustor [4].

The metal deposited on the upgrading material by injection of organo-metallic additive acts as catalyst for partial regeneration of coke with steam. The role of the catalyst in partial regeneration of coke with steam is to increase the rate of reaction. Since, catalytic effect decreases with increasing temperature; it is advisable to keep Reformer temperature not more than 850° C. It is seen that at Reformer temperatures below 650° C., methane production is favored. Catalyst is more effective in driving the reactions 1 and 2 if steam is present in excess. The optimum concentration of the select metal on the spent upgrading material is 1000 to 2000 ppmw, beyond which either negligible or negative effects are observed as it reduces the surface area further. The syngas comprises (on dry basis) 50-70 vol % $H_2$, 12-18 vol % CO, 10-15% $CO_2$, 1-4% $CH_4$, and sour gases such as $H_2S$ and COS, whose concentration mostly depends on the sulfur content of feedstock & the calorific value of the syngas is in the range of 220-250 BTU/SCF.

The process of preparation of high quality syngas rich in hydrogen involves partial regeneration of more amount of coke with steam in Reformer and burning of an external hydrocarbon stream lean in sulfur and nitrogen in Combustor is performed to maintain temperature of the Combustor by burning of lower amount of coke in Combustor. This process helps in maintaining the heat balance of the system. This further helps in reduction of SOx and NOx emissions during the regeneration of spent upgrading material by burning hydrocarbon stream lean in sulfur and nitrogen in Combustor and reforming more coke with steam in Reformer.

TABLE 1

Comparison of Product Quality of syngas obtained as per the prior art and the present invention process:

| Sr. No | Products | Prior Art, vol %, Ref: China Downstream Technology Conference, May 2011 | Present Invention, vol % |
|---|---|---|---|
| 1 | $H_2$ + CO | 40 | 75.0 |
| 2 | $N_2$ | 48 | <1 |

TABLE 1-continued

Comparison of Product Quality of syngas obtained as per the prior art and the present invention process:

| Sr. No | Products | Prior Art, vol %, Ref: China Downstream Technology Conference, May 2011 | Present Invention, vol % |
|---|---|---|---|
| 3 | $CO_2$ | NA | 18.0 |
| 6 | Others | 12 | 6.0 |

Another aspect of the present invention provides a system for producing pure hydrogen from syngas comprises a Cooler [18] for cooling the syngas to 100-300° C. before compressing the syngas with compressor [19] to a predetermined high pressure up to 30 kg/cm²(g). The Cooler may be a boiler for extracting the heat from syngas for production of steam. The compressed syngas is cooled in a Cooler [20] to 200-300° C. and then sent to Integrated Sour-Shift Reactor System [21] wherein COS is converted to $H_2S$ and additional $H_2$ is produced by water-gas shift reaction of CO with water vapor. Hydrogen is then separated from the shift reactor effluent using Pressure Swing Adsorption [22]. Alternatively, Reformer can be operated at higher pressure up to 30 kg/cm²g. In such case, there is no need of syngas compressor as described above.

Accordingly the main embodiment of the present invention relates to a process for producing syngas rich in hydrogen, during the process of upgrading residual hydrocarbon oil feedstock, the process comprising, partially regenerating spent upgrading agent, obtained from a Riser, in a Reformer with steam and in absence of oxygen containing gases to obtain syngas rich in hydrogen, wherein the spent upgrading agent constitutes 1 to 5 wt % coke, and the Reformer is maintained at a temperature of 650 to 850° C. without supplying external heat.

In other embodiment, the temperature of the Reformer is maintained by circulating the rejuvenated agent from the Combustor to the Reformer.

In another embodiment, the process for producing syngas rich in hydrogen further involves injecting an oil soluble organo-metallic additive selected from alkali and alkaline earth metal additives in the Reformer.

In one another embodiment, the partially rejuvenated upgrading agent from the Reformer is transferred to a Combustor and burning the partially rejuvenated upgrading agent at a temperature in the range of 750° C. to 950° C. and in presence of a stream of oxygen containing gases in the Combustor to obtain rejuvenated upgrading agent and flue gas.

In further embodiment, the process of producing syngas rich in hydrogen optionally comprises of introducing a stream of hydrocarbon lean in sulfur and nitrogen impurities into the Combustor while burning the partially rejuvenated upgrading agent.

In furthermore embodiment, the process of producing syngas rich in hydrogen comprises of combining the rejuvenated upgrading agent from the Combustor and the spent upgrading agent from the Riser, in a Mixer, prior to introducing to the Reformer wherein the Mixer is placed either outside the Reformer or forms the part of the Reformer.

In still another embodiment, the spent upgrading agent is separated from the cracked products obtained from the Riser, in a Stripper, prior to introducing to the Reformer.

In other embodiment, the present invention relates to a process for producing syngas rich in hydrogen, during the process of upgrading residual hydrocarbon oil feedstock, the process comprising:

a) cracking a residual hydrocarbon oil feedstock in a Riser-Reactor by contacting the feedstock with a rejuvenated upgrading agent at a temperature in the range of 550° C. to 650° C. to obtain cracked products and spent upgrading agent;

b) separating the spent upgrading agent from the cracked products in a Stripper and transferring the spent upgrading agent to a Reformer;

c) regenerating the coke deposited on the spent upgrading agent by adding steam free of any air/oxygen along with organo-metallic additive selected from alkali, alkaline earth metal or transition metal additive in the Reformer at a temperature in the range of 600 to 850° C. to obtain syngas rich in hydrogen and partially rejuvenated upgrading agent and transferring the partially rejuvenated upgrading agent to a Combustor;

d) burning off the partially rejuvenated upgrading material in the Combustor at temperature in the range of 750° C. to 950° C. to remove residual coke in presence of stream of oxygen containing gases and optionally a hydrocarbon stream lean in sulfur and nitrogen impurities, to obtain rejuvenated upgrading agent and flue gas;

e) transferring the rejuvenated upgrading agent back to the Reformer to maintain the temperature of the Reformer; and f) circulating the rejuvenated upgrading agent from the Reformer to the Riser.

In furthermore embodiment, the process of producing syngas rich in hydrogen comprises of combining the rejuvenated upgrading agent from the Combustor and the Spent upgrading agent from the Riser, in a Mixer, prior to introducing to the Reformer wherein the Mixer is placed either outside the Reformer or forms the part of the Reformer.

In still another embodiment, the present invention further comprises cooling the syngas obtained from the Reformer in a Cooler and passing through Integrated Sour-Shift Reactor System to obtain pure hydrogen.

In still another embodiment, the present invention comprises passing the flue gas obtained from the Combustor to a Power Recovery Turbine to generate steam.

In one another embodiment, the rejuvenated upgrading material consists of porous fluidizable micro spherical particles belonging to Geldart Group A having total deposit of metals in the range of 1-2 wt %.

In yet another embodiment, the rejuvenated upgrading agent used in the process of cracking of residual hydrocarbon oil feedstock consists of porous fluidizable micro spherical particles composed of alumina, silica alumina, kaolin clay or mixture thereof.

In another embodiment, the rejuvenated upgrading agent possess particle size in range of 20-200 microns, particle density in the range of 1200-1600 kg/m³ and surface area above 80 m²/g.

In still another embodiment, the residual hydrocarbon oil feedstock is selected from the group comprising of bitumen, vacuum residue, vacuum slop, atmospheric residue, asphalts, visbreaker tar, heavy crude oil, and the like, containing significant amount of concarbon, nickel, vanadium, sodium, basic nitrogen and sulfur impurities.

In further embodiment, the organo-metallic additive which is added to the Reformer along with the steam is selected from Na and K from alkali group; Mg and Ca from alkaline-earth group; and Fe from transition group.

In still further embodiment, the organo-metallic additive which is added to the Reformer along with the steam is selected from alkali group like Na and K.

In another embodiment, the organo-metallic additive which is added to the Reformer along with the steam is selected from alkaline-earth group like Mg and Ca.

In still another embodiment, the organo-metallic additive which is added to the Reformer along with the steam is selected from transition group like Fe.

In furthermore embodiment, the organo-metallic additive added to the Reformer results into deposition of select metal on the coke deposited on the upgrading material in the reformer, wherein the concentration of the select metal on the upgrading material is in the range of 1000 to 2000 ppmw.

In a preferred embodiment, the metal deposited on the coke of upgrading material is in the range of 1-2 wt %.

In one another preferred embodiment, the rejuvenated upgrading material is transferred back from Combustor to Reformer to maintain the temperature in Reformer. The re-circulation of the rejuvenated upgrading material acts as a heat source for the Reformer and hence no external heat source is required in the process.

In another embodiment, the rejuvenated upgrading material from Reformer is transferred to Riser Reactor by means of transfer line [17].

In a preferred embodiment, the present invention relates to the syngas (on dry basis) comprising of 50-70 vol % hydrogen, 12-18% vol % carbon monoxide, 10-15 vol % Carbon dioxide, 1-4 vol % methane and sour gases like $H_2S$ and COS.

In other embodiment, the present invention relates to a system for producing syngas rich in hydrogen, during the process of upgrading residual hydrocarbon oil feedstock, the system comprising:
   a) cracking zone comprising a Riser-Reactor [1];
   b) a two stage regeneration zone comprising a Reformer [3] and a Combustor [4]; and
   c) a circulation zone comprising a means [16] for recycling of rejuvenated upgrading agent from Combustor [4] to Reformer [3].

In another embodiment, the cracking zone further comprises:
   a) means for injecting residual feedstock [5] and fluidizing cum atomizing medium [6];
   b) means for injecting the rejuvenated upgrading material [17] into the Riser Reactor [1] from Reformer [3]; and
   c) a reactor cum Stripper vessel for separating the cracked products [7] and spent upgrading agent [8].

In still another embodiment, the Reformer [3] includes a means [12] for transferring the partially rejuvenated upgrading agent to the Combustor [4], wherein said means [12] comprises of lift line having plug valve for controlling the circulation of solids through the lift line.

In further embodiment, the system for producing syngas rich in hydrogen further comprising:
   a) a means of cooling syngas [11] in Coolers [18, 20];
   b) a means of compressing syngas [11] in a Compressor [19];
   c) a means for converting COS to $H_2S$ and converting additional $H_2$ by water-shift reaction using an Integrated Sour-Shift Reactor system [21]; and
   d) a means of separating $H_2$ from the mixture of gases using Pressure Swing Adsorption [22].

In further embodiment, the Cooler [18] has temperature in the range of 100-300° C. and Cooler [20] has a temperature in the range of 200-300° C.

In still another embodiment, the Compressor [19] compresses the syngas to a pressure of up to 30 kg/cm² to get compressed syngas.

In yet another embodiment, the present invention relates to a process of producing syngas rich in hydrogen wherein pure hydrogen from syngas is produced in steps of:
   a) cooling the syngas [11] to a predetermined temperature range in a Cooler [18];
   b) compressing the syngas [11] of step (a) to a predetermined high pressure in a Compressor [19] to get compressed syngas;
   c) cooling the compressed syngas of step (b) to a predetermined temperature range in a Cooler [20];
   d) transferring the compressed syngas of step (c) to an Integrated Sour-Shift Reactor system [21] to convert COS to $H_2S$ and to convert additional $H_2$ by water-gas shift reaction; and
   e) obtaining pure $H_2$ from the shift reactor effluent using Pressure Swing Adsorption [22].

In yet another embodiment, the cooling of the syngas is carried out to cool the syngas to a temperature range of 100-300° C.

In further embodiment, the compressing of the syngas is carried out at a pressure of up to 30 kg/cm² to get compressed syngas.

In furthermore embodiment, the cooling of compressed syngas is carried out to cool the compressed syngas to a temperature range of 200-300° C.

The invention claimed is:

1. A process for producing syngas rich in hydrogen, during the process of upgrading residual hydrocarbon oil feedstock, the process, consisting of partially regenerating spent upgrading agent, obtained from a Riser, in a Reformer with steam and in presence of an organo-metallic additive wherein the metal of the organo-metallic additive is selected from alkali metals, alkaline earth metals or transition metals and in absence of oxygen containing gases to obtain syngas rich in hydrogen, wherein the spent upgrading agent constitutes 1 to 5 wt % coke, and the Reformer is maintained at a temperature of 650 to 850° C. without supplying external heat;

wherein the upgrading agent is selected from the group consisting of alumina, silica alumina, kaolin clay and mixtures thereof;

further wherein:
   optionally, the temperature of the Reformer is maintained by circulating a rejuvenated upgrading agent from a Combustor to the Reformer;
   optionally, introducing partially rejuvenated upgrading agent from the Reformer, to the Combustor and burning the partially rejuvenated upgrading agent at a temperature in the range of 750° C. to 950° C. and in presence of a stream of oxygen containing gases in the Combustor to obtain rejuvenated upgrading agent and flue gas;
   optionally, introducing the rejuvenated upgrading agent from the Combustor to the Reformer;
   optionally, introducing a stream of hydrocarbon lean in sulfur and nitrogen impurities into the Combustor while burning the partially rejuvenated upgrading agent;
   optionally, combining the rejuvenated upgrading agent from the Combustor and the spent upgrading agent from the Riser, in a Mixer, prior to introducing to the Reformer wherein the Mixer is placed either outside the Reformer or forms a part of the Reformer; and
   optionally, wherein the spent upgrading agent is separated from the cracked products obtained from the Riser, in a Stripper, prior to introducing to the Reformer.

2. The process of claim 1, wherein the temperature of the Reformer is maintained by circulating a rejuvenated upgrading agent from a Combustor to the Reformer.

3. The process of claim 1, wherein the process includes introducing partially rejuvenated upgrading agent from the Reformer, to the Combustor and burning the partially rejuvenated upgrading agent at a temperature in the range of 750° C. to 950° C. and in presence of a stream of oxygen containing gases in the Combustor to obtain rejuvenated upgrading agent and flue gas.

4. The process of claim 3, wherein the process includes introducing the rejuvenated upgrading agent from the Combustor to the Reformer.

5. The process of claim 3, wherein the process includes introducing a stream of hydrocarbon lean in sulfur and nitrogen impurities into the Combustor while burning the partially rejuvenated upgrading agent.

6. The process of claim 3, wherein the process includes combining the rejuvenated upgrading agent from the Combustor and the spent upgrading agent from the Riser, in a Mixer, prior to introducing to the Reformer wherein the Mixer is placed either outside the Reformer or forms the part of the Reformer.

7. The process of claim 1, wherein the spent upgrading agent is separated from the cracked products obtained from the Riser, in a Stripper, prior to introducing to the Reformer.

* * * * *